United States Patent
Hirata

(10) Patent No.: US 9,205,748 B2
(45) Date of Patent: Dec. 8, 2015

(54) REGENERATIVE BRAKING CONTROL DEVICE FOR VEHICLE

(75) Inventor: Takeshi Hirata, Kawasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 201 days.

(21) Appl. No.: 13/880,478

(22) PCT Filed: Oct. 20, 2011

(86) PCT No.: PCT/JP2011/074191
§ 371 (c)(1),
(2), (4) Date: Apr. 19, 2013

(87) PCT Pub. No.: WO2012/053609
PCT Pub. Date: Apr. 26, 2012

(65) Prior Publication Data
US 2013/0238208 A1 Sep. 12, 2013

(30) Foreign Application Priority Data
Oct. 22, 2010 (JP) ................. 2010-237539

(51) Int. Cl.
| | |
|---|---|
| B60L 7/18 | (2006.01) |
| B60K 6/48 | (2007.10) |
| B60L 11/14 | (2006.01) |
| B60W 10/08 | (2006.01) |
| B60W 10/184 | (2012.01) |
| B60W 20/00 | (2006.01) |
| B60W 30/18 | (2012.01) |

(Continued)

(52) U.S. Cl.
CPC ... *B60L 7/18* (2013.01); *B60K 6/48* (2013.01); *B60L 3/0061* (2013.01); *B60L 3/04* (2013.01); *B60L 11/14* (2013.01); *B60L 15/2009* (2013.01); *B60W 10/08* (2013.01); *B60W 10/184* (2013.01); *B60W 20/00* (2013.01); *B60W 30/18127* (2013.01); *B60L 2240/12* (2013.01); *B60L 2240/423* (2013.01); *B60L 2240/443* (2013.01); *B60L 2240/486* (2013.01); *B60L 2240/507* (2013.01); *B60L 2270/145* (2013.01); *B60W 2720/106* (2013.01); *Y02T 10/6221* (2013.01); *Y02T 10/642* (2013.01); *Y02T 10/70* (2013.01); *Y02T 10/7077* (2013.01); *Y02T 10/7275* (2013.01); *Y10S 903/947* (2013.01)

(58) Field of Classification Search
CPC ............... B60W 10/08; B60W 20/00; B60W 30/18127; B60W 20/1062; B60W 30/18109
See application file for complete search history.

(56) References Cited

U.S. PATENT DOCUMENTS

| | | | | |
|---|---|---|---|---|
| 4,547,678 | A | * | 10/1985 | Metzner et al. ............. 290/40 C |
| 5,716,108 | A | * | 2/1998 | Asa et al. ........................ 303/3 |

(Continued)

FOREIGN PATENT DOCUMENTS

| | | |
|---|---|---|
| JP | 63-29301 A | 2/1988 |
| JP | 63-29301 U | 2/1988 |

(Continued)

*Primary Examiner* — Nicholas Kiswanto
(74) *Attorney, Agent, or Firm* — Foley & Lardner LLP

(57) ABSTRACT

A regenerative braking control device for a vehicle includes: a driver request braking torque computation unit configured to compute a driver request braking torque based on brake pedaling of a driver; and a regenerative braking torque computation unit configured to compute a regenerative braking torque by restricting a response time of the regenerative braking torque to match a braking rate of a frictional brake based on a vehicle speed and the computed driver request braking torque, and compute the regenerative braking torque by releasing restriction on the response time of the regenerative braking torque in a case where the driver request braking torque decreases.

4 Claims, 5 Drawing Sheets

(51) Int. Cl.
*B60L 3/00* (2006.01)
*B60L 3/04* (2006.01)
*B60L 15/20* (2006.01)

(56) References Cited

U.S. PATENT DOCUMENTS 5,967,621 A * 10/1999 Ito et al. ............................ 303/15
6,086,166 A * 7/2000 Fukasawa ...................... 303/152
6,739,677 B2 * 5/2004 Tazoe et al. ................... 303/152
7,136,737 B2 * 11/2006 Ashizawa et al. ................ 701/70
8,608,255 B2 * 12/2013 Shimada et al. .............. 303/152

FOREIGN PATENT DOCUMENTS

| JP | 2008-013136 A | 1/2008 |
| JP | 2011-101561 A | 5/2011 |
| JP | 2011-199958 A | 10/2011 |

* cited by examiner

REGENERATIVE BRAKING CONTROL DEVICE FOR VEHICLE

TECHNICAL FIELD

The present disclosure relates to a regenerative braking control device for a vehicle.

BACKGROUND ART

A technique of braking a vehicle by cooperatively operating a frictional brake and a regenerative brake is disclosed in JP-S63-29301-U.

In some systems, in a case where a vehicle stops by cooperatively operating a frictional brake and a regenerative brake in this manner, a response time of the regenerative brake precedes a response time of the frictional brake. In these systems, there is a possibility that a shock may occur due to a difference of the response time. In this regard, a shock is prevented by delaying the response time of the regenerative brake to match the response time of the frictional brake.

SUMMARY

However, through diligent studies, the inventors found a fact that it is desirable not to delay the response time of the regenerative brake depending on a drive situation.

This disclosure has been made by focusing on such problems in prior art. It is therefore an object of the disclosure to provide a regenerative braking control device for a vehicle, capable of executing more desirable regenerative braking control by not delaying a response time of a regenerative brake depending on a drive situation.

A regenerative braking control device for a vehicle according to an embodiment of the present invention includes a driver request braking torque computation unit configured to compute a driver request braking torque based on brake pedaling of a driver. In addition, the regenerative braking control device for a vehicle further includes a regenerative braking torque computation unit configured to compute a regenerative braking torque by restricting a response time of the regenerative braking torque to match a braking rate of a frictional brake based on a vehicle speed and the computed driver request braking torque, and compute the regenerative braking torque by releasing restriction on the response time of the regenerative braking torque in a case where the driver request braking torque decreases.

The foregoing and additional features and characteristics of this disclosure will become more apparent from the following detailed description considered with the reference to the accompanying drawings.

EMBODIMENTS

First Embodiment

Figure 1:
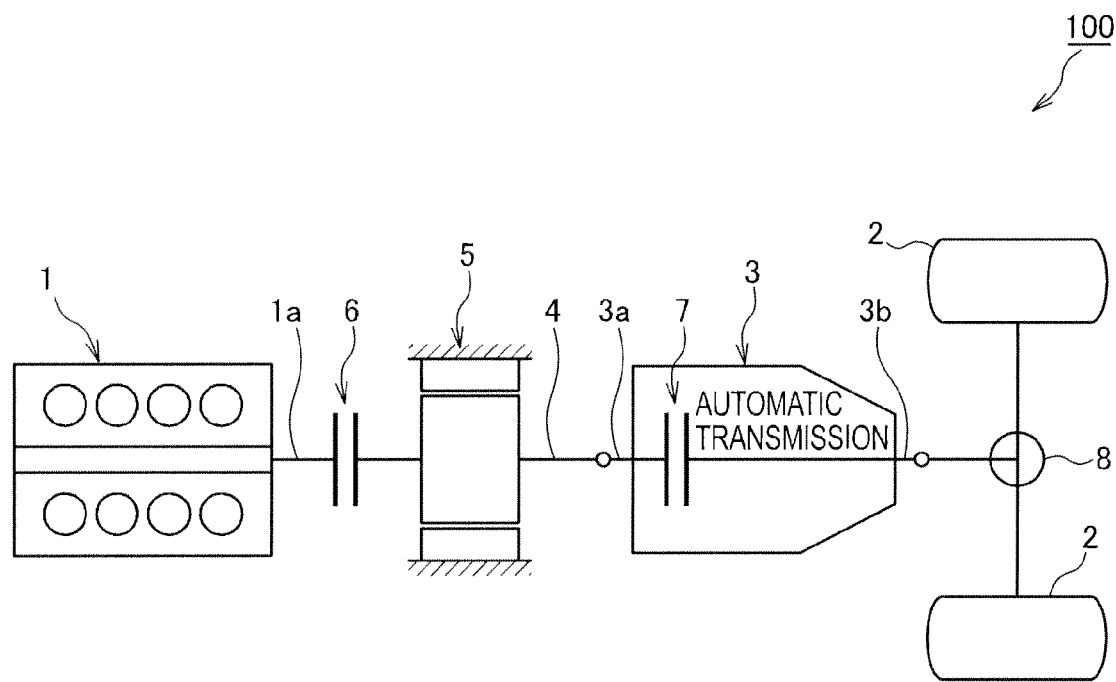
FIG. 1 is a diagram illustrating an exemplary power train of a hybrid vehicle having a regenerative braking control device according to the present invention.

FIG. 1 is a diagram illustrating an exemplary power train of a hybrid vehicle having a regenerative braking control device according to the present invention.

The vehicle 100 is a so-called hybrid vehicle in which a drive wheel 2 is driven using an internal combustion engine 1 and a motor/generator 5. The hybrid vehicle 100 is a front-engine/rear-wheel drive vehicle.

The power train of the hybrid vehicle 100 illustrated in FIG. 1 includes an internal combustion engine 1, an automatic transmission 3, and a motor/generator 5.

Similar to a typical rear-wheel drive vehicle, the automatic transmission is placed in a rear side of the longitudinal direction of a vehicle in tandem.

The motor/generator 5 is placed between the engine 1 and the automatic transmission 3. The motor/generator 5 is coupled to a shaft 4 for transferring rotation from the engine 1 (crankshaft 1a) to an input shaft 3a of the automatic transmission 3. The motor/generator 5 serves as either a motor or a generator depending on a vehicle drive state.

A first clutch 6 is interposed between the engine 1 and the motor/generator 5, and more specifically, between the engine crankshaft 1a and the shaft 4. The first clutch 6 can change a transfer torque capacity continuously or stepwise. As such a clutch, for example, there is known a wet type multi-plate clutch capable of changing the transfer torque capacity by controlling a clutch hydraulic fluid flow and a clutch hydraulic pressure continuously using a proportional solenoid. While the transfer torque capacity becomes zero, the first clutch 6 is completely released, and the engine 1 and the motor/generator 5 are also completely disconnected from each other.

As the first clutch 6 is completely released, an output torque of the engine 1 is not transferred to the drive wheel 2, and only an output torque of the motor/generator 5 is transferred to the drive wheel 2. This state refers to an electric vehicle (EV) mode. Meanwhile, as the first clutch 6 is connected, the output torque of the engine 1 is also transferred to the drive wheel 2 along with the output torque of the motor/generator 5. This state refers to a hybrid electric vehicle (HEV) mode. In this manner, a drive mode switches by connecting/disconnecting the first clutch 6. The first clutch 6 is an engine-side clutch.

A second clutch 7 is interposed between the motor/generator 5 and the differential gear unit 8, and more specifically, between the transmission input shaft 3a and the transmission output shaft 3b. In FIG. 1, the second clutch 7 is integrated into the automatic transmission 3. Such a second clutch 7 may be implemented, for example, by applying an existing frictional element for selecting a forward drive gear position or an existing frictional element for selecting a backward drive gear position in the automatic transmission 3. Similar to the first clutch 6, the second clutch 7 may also change the transfer torque capacity continuously or stepwise. As such a clutch, for example, there is known a wet type multi-plate clutch capable of changing the transfer torque capacity by controlling a clutch hydraulic fluid flow and a clutch hydraulic pressure continuously or using a proportional solenoid. While the transfer torque capacity becomes zero, the second clutch 7 is completely released, and the motor/generator 5 and the differential gear unit 8 are completely disconnected from each other. When the engine starts, slip control is performed by decreasing the transfer torque capacity of the second clutch 7. As a result, it is possible to prevent a shock that may be generated when the engine 1 starts from being transferred to the drive wheel 2. The second clutch 7 is a clutch located in the drive wheel side.

The automatic transmission 3 may be, for example, the one described in "New Skyline Model CV35" issued by Nissan Motor Co., Ltd., on January 2003. A power transmission path (gear position) is determined based on a combination of engagement and release of a plurality of frictional elements (such as a clutch or a brake) by selectively engaging or releasing such frictional elements. Therefore, the automatic transmission 3 performs gearshift for rotation from the input shaft 3*a* depending on a gear ratio corresponding to the selected gear position and outputs the rotation to the output shaft 3*b*. This output rotation is distributed and transmitted to the left and right drive wheels 2 through a differential gear unit 8 and is provided for a vehicle drive. Although the aforementioned description of the automatic transmission 3 relates to a gearshift type transmission, the embodiment is not limited thereto. For example, the embodiment may also be applicable to a continuously variable transmission (CVT).

In the power train described above in conjunction with FIG. 1, power from the engine 1 is not necessary in the electric vehicle (EV) mode, which is used in a low load and a low vehicle speed such as a case where a vehicle starts to departure from a stop state. Therefore, the engine 1 stops, the first clutch 6 is released, and the second clutch 7 is engaged. Furthermore, the automatic transmission 3 has a power transfer state. In this state, the motor/generator 5 is driven. Then, only the rotation output from the motor/generator 5 reaches the transmission input shaft 3*a*. The automatic transmission 3 performs gearshift for the rotation input from the input shaft 3*a* depending on the selected gear position and outputs the rotation from the transmission output shaft 3*b*. Then, the rotation output from the transmission output shaft 3*b* reaches the drive wheel 2 through the differential gear unit 8. In this manner, a vehicle travels only using the motor/generator 5 in the electric vehicle (EV) mode.

In the hybrid electric vehicle (HEV) mode, which is used in a high speed or a high load, both the first and second clutches 6 and 7 are engaged, and the automatic transmission 3 has a power transfer state. In this state, both the rotation output from the engine 1 and the rotation output from the motor/generator 5 reach the transmission input shaft 3*a*. The automatic transmission 3 performs gearshift for the rotation input from the input shaft 3*a* depending on the selected gear position and outputs the rotation from the transmission output shaft 3*b*. Then, the rotation output from the transmission output shaft 3*b* reaches the drive wheel 2 through the differential gear unit 8. In this manner, a vehicle travels in the hybrid electric vehicle (HEV) mode using both the engine 1 and the motor/generator 5.

Energy may remain if the engine is driven at an optimal fuel consumption during the drive in such an HEV mode. In this case, this surplus energy may be converted into electrical power by operating the motor/generator 5, and the generated electrical power may be stored in a battery for use in the motor driving of the motor/generator 5. As a result, it is possible to improve a fuel consumption of the engine 1.

In such a vehicle, deceleration is made by applying the motor/generator 5, and the kinetic energy of the vehicle is regenerated. A method of decelerating the vehicle in this manner is called a regenerative brake.

In this case, in some systems, a response time of the regenerative brake precedes a response time of the frictional brake. In these systems, there is a possibility that a shock may occur due to a difference of the response time. In this regard, a shock is prevented by delaying the response time of the regenerative brake to match the response time of the frictional brake.

However, through diligent studies, the inventors found a fact that it is desirable not to delay the response time of the regenerative brake depending on a drive situation.

In this regard, the inventors found a fact that more desirable regenerative braking control can be executed by not delaying the response time of the regenerative brake depending on a drive situation. This will be described hereinafter.

Figure 2:
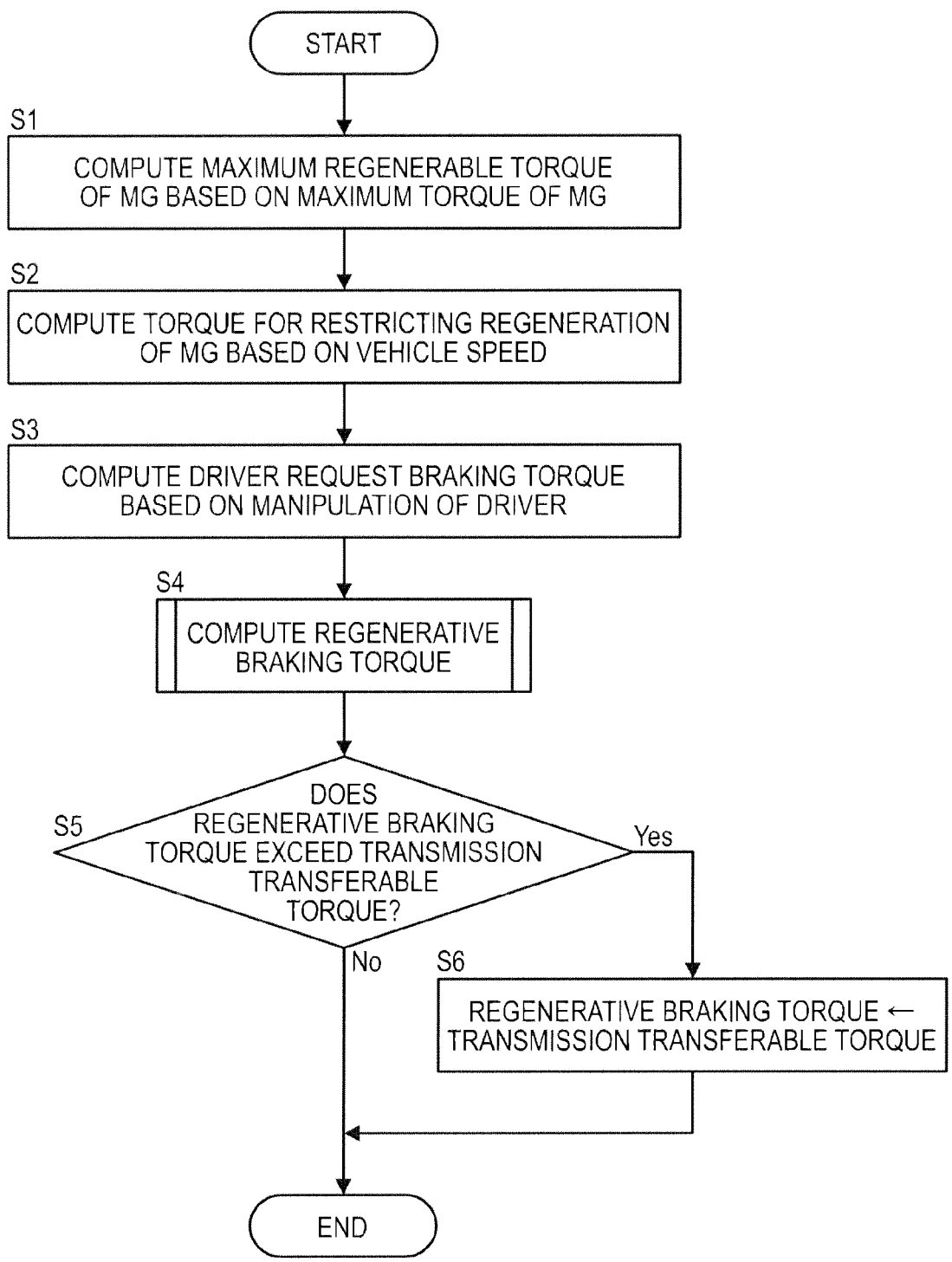
FIG. 2 is a flowchart illustrating a control operation executed by a controller of the regenerative braking control device for a vehicle according to the present invention.

FIG. 2 is a flowchart illustrating a control operation executed by the controller of the regenerative braking control device for a vehicle according to the present invention.

In step S1, the controller computes a maximum regenerable torque of the motor/generator based on the maximum torque of the motor/generator. The maximum torque of the motor/generator may change depending on a charge rate of the battery. That is, if the battery is nearly fully charged, the maximum torque of the motor/generator decreases because it is difficult to charge the battery over the fully charged state. In contrast, if the battery has a nearly vacant charge state, the maximum torque of the motor/generator increases.

In step S2, the controller computes a torque for restricting regenerative braking of the motor/generator based on the vehicle speed. If the vehicle speed is zero, it is difficult for the motor/generator to execute the regenerative braking. Therefore, if the vehicle speed is lower than a predetermined value close to zero, the torque for restricting regenerative braking is set to zero. If the vehicle speed is equal to or higher than the predetermined speed, the controller computes the a torque for restricting regenerative braking depending on the vehicle speed.

In step S3, the controller computes a driver request braking torque based on brake pedaling of a driver. When the brake pedaling of a driver is strong and fast, computation is made by increasing the driver request braking torque.

In step S4, the controller computes the regenerative braking torque. As a specific exemplary method, the smallest value out of the maximum regenerable torque computed in step S1, the torque for restricting regenerative braking computed in step S2, and the driver request braking torque computed in step S3 is set to the regenerative braking torque. Alternatively, the regenerative braking torque may be computed based on the vehicle speed and the driver request braking torque. This method will be described below in more detail.

In step S5, the controller determines whether or not the regenerative braking torque exceeds a transmission transferable torque. If the regenerative braking torque is greater than the transmission transferable torque, a slide is generated in the transmission, and it is difficult to transfer the torque. In this regard, when the regenerative braking torque exceeds the transmission transferable torque, the controller advances the process to step S6 and restricts the regenerative braking torque to the transmission transferable torque.

Figure 3:
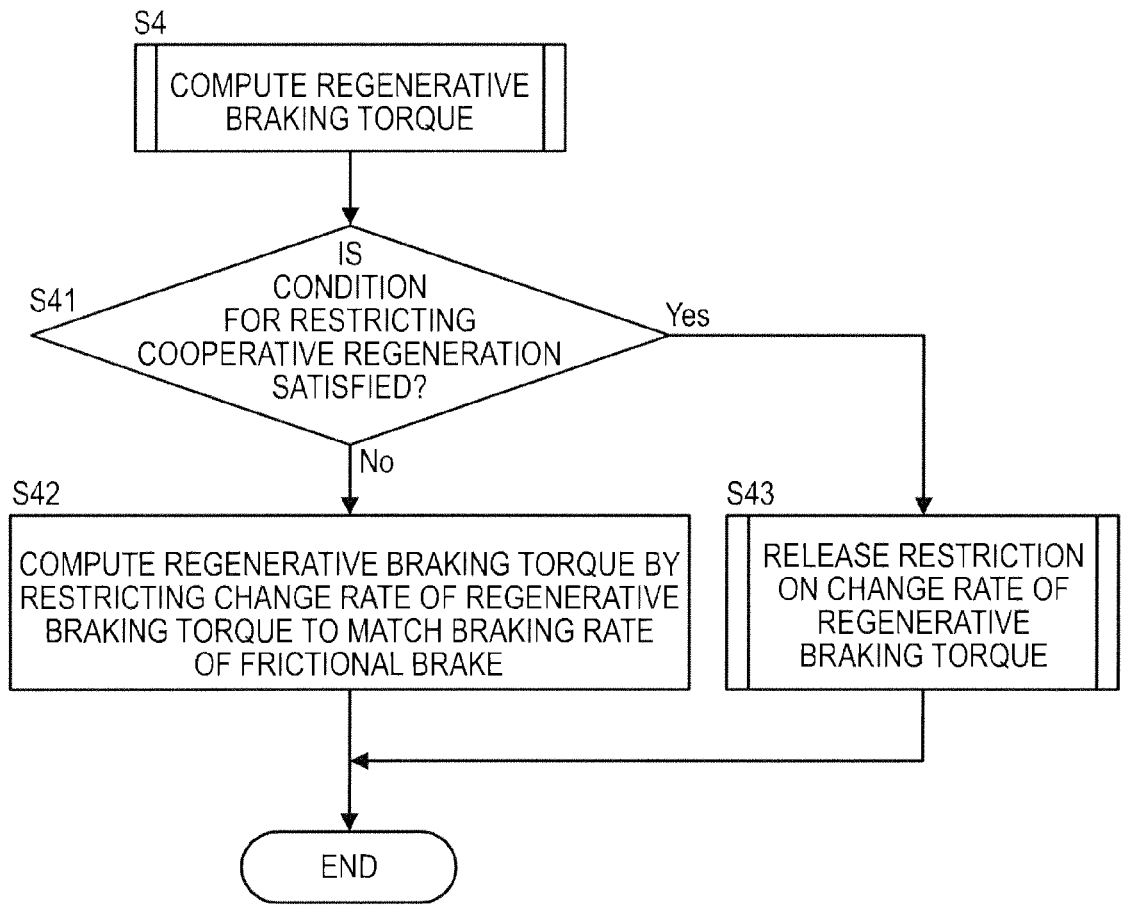
FIG. 3 is a flowchart illustrating regenerative braking torque computation executed by the controller of the regenerative braking control device for a vehicle according to the present invention.

FIG. 3 is a flowchart illustrating a regenerative braking torque computation executed by the controller of the regenerative braking control device for a vehicle according to the present invention.

In step S41, the controller determines whether or not a condition for restricting cooperative regeneration is satisfied. Specifically, it is assumed that the condition for restricting cooperative regeneration is satisfied if the driver request braking torque decreases in a case where the driver request braking torque computed in step S3 is employed as the regenerative braking torque. If the condition for restricting cooperative regeneration is not satisfied, the controller advances the process to step S42. If the condition for restricting cooperative regeneration is satisfied, the controller advances the process to step S43.

In step S42, the controller computes the regenerative braking torque by restricting the response time of the regenerative braking torque to match the braking rate of the frictional brake. In a system in which the response time of the regenerative brake precedes the response time of the frictional brake, there is a possibility that a shock may occur due to a difference of the response time. However, it is possible to prevent a shock by restricting the response time of the regenerative braking torque in this manner.

In step S43, the controller releases the restriction on the response time of the regenerative braking torque. Specifically, the regenerative braking torque may be immediately set to zero if the driver request braking torque abruptly decreases (that is, if a driver immediately steps off the brake pedal).

In some systems, kinetic energy of a vehicle is regenerated while the vehicle stops by applying the regenerative brake. In this case, in some systems, the response time of the regenerative brake precedes the response time of the frictional brake. In these systems, there is a possibility that a shock may occur due to a difference of the response time. In this regard, a shock is prevented by delaying the response time of the regenerative brake to match the response time of the frictional brake.

However, in some situations, a driver may suddenly release the brake pedal after continuously stepping on the brake pedal. Through diligent investigation, the inventors found a fact that, if the response time of the regenerative brake is delayed in such a situation, a driver may have an inconsistent feeling such that a brake is not released even when a driver steps off the brake pedal.

In this regard, the inventors contrived not to delay the response time of the regenerative brake as in the present embodiment. In this way, it is possible to prevent a driver from having a useless inconsistent feeling.

Second Embodiment

Figure 4:
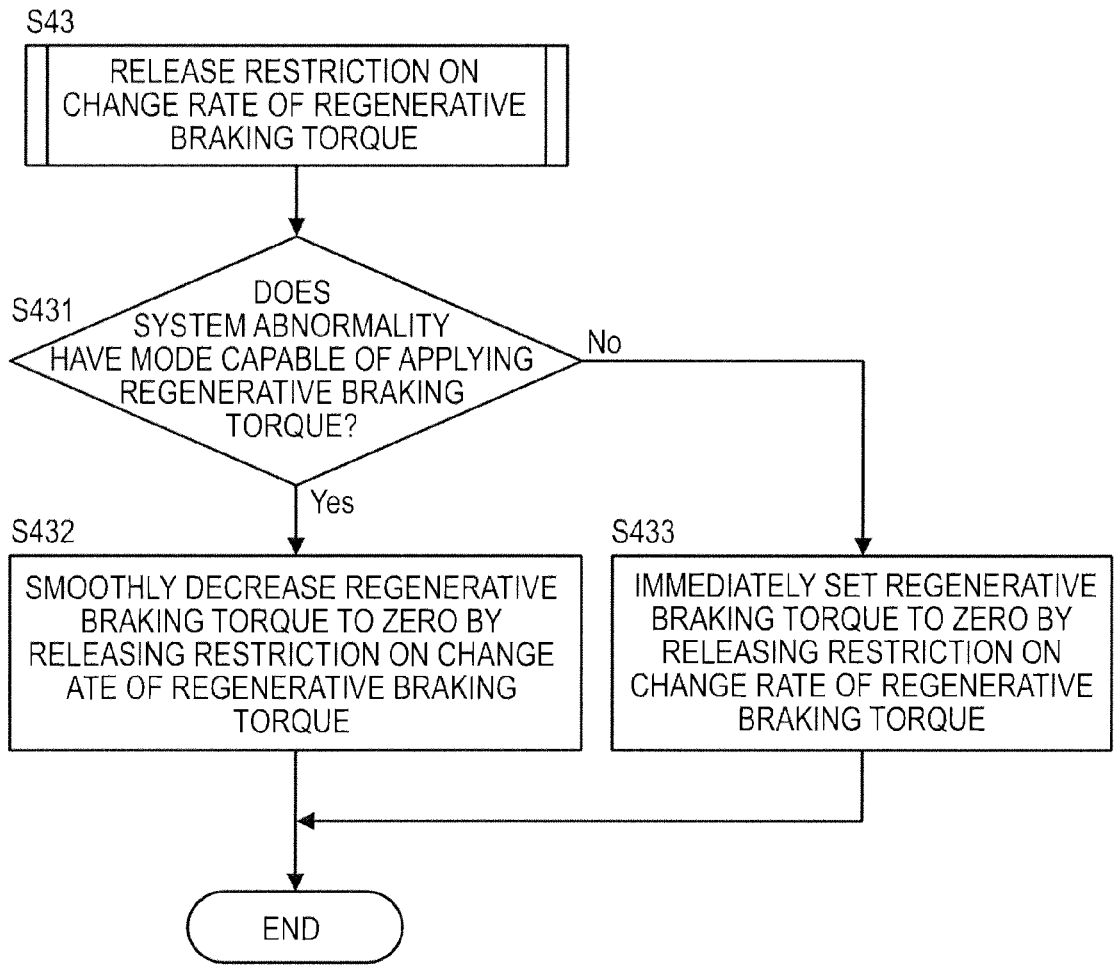
FIG. 4 is a flowchart illustrating a routine for releasing restriction on a response time of the regenerative braking torque executed by the controller of the regenerative braking control device for a vehicle according to a second embodiment of the present invention.

FIG. 4 is a flowchart illustrating a routine for releasing the restriction of the response time of the regenerative braking torque executed by the controller of the regenerative braking control device for a vehicle according to a second embodiment of the present invention.

In the first embodiment, it is assumed that the condition for restricting cooperative regeneration is satisfied when the driver request braking torque decreases in a case where the driver request braking torque computed in step S3 is employed as the regenerative braking torque (step S41). In addition, when the condition for restricting cooperative regeneration is satisfied, the regenerative braking torque is immediately set to zero (step S43).

In contrast, according to the present embodiment, in step S41, it is determined that the condition for restricting cooperative regeneration is satisfied when system abnormality occurs, such as a malfunction in the motor/generator or the transmission.

When system abnormality occurs, in step S431, the controller determines whether or not the system abnormality has a mode capable of applying the regenerative braking torque. The mode capable of applying the regenerative braking torque includes, for example, a mode in which gearshift is not possible due to a malfunction of the transmission (that is, a gear position is fixed). The mode incapable of applying the regenerative braking torque includes, for example, a mode in which the motor/generator is malfunctioned. For example, the mode incapable of applying the regenerative braking torque also includes a case where communication is impossible when control is performed in combination between a plurality of controllers through communication.

When system abnormality has a mode capable of applying the regenerative braking torque, the controller advances the process to step S432. Meanwhile, when system abnormality has a mode incapable of applying the regenerative braking torque, the controller advances the process to step S433.

In step S432, the controller releases restriction on the response time of the regenerative braking torque and smoothly decreases the regenerative braking torque to zero.

In step S433, the controller releases restriction on the response time of the regenerative braking torque and immediately sets the regenerative braking torque to zero.

According to the present embodiment, when system abnormality occurs, the response time of the regenerative brake is not delayed. In a case where the regenerative braking torque is not applicable, the processing time uselessly elapses even when the response time of the regenerative braking torque is restricted. Therefore, the restriction on the response time of the regenerative braking torque is released, and the regenerative braking torque is immediately set to zero. In this way, it is possible to rapidly respond to abnormality. In contrast, in a case where the regenerative braking torque is applicable, the restriction on the response time of the regenerative braking torque is released, and the regenerative braking torque smoothly decreases to zero. In this way, it is possible to avoid an abrupt change and reliably obtain a braking force without a shock.

While the invention has been described with reference to certain embodiments, they are only exemplary applications of the present invention and not intended to limit the invention. It is not intended to limit the technical range of the present invention to the specific configuration of the aforementioned embodiments.

Figure 5A:
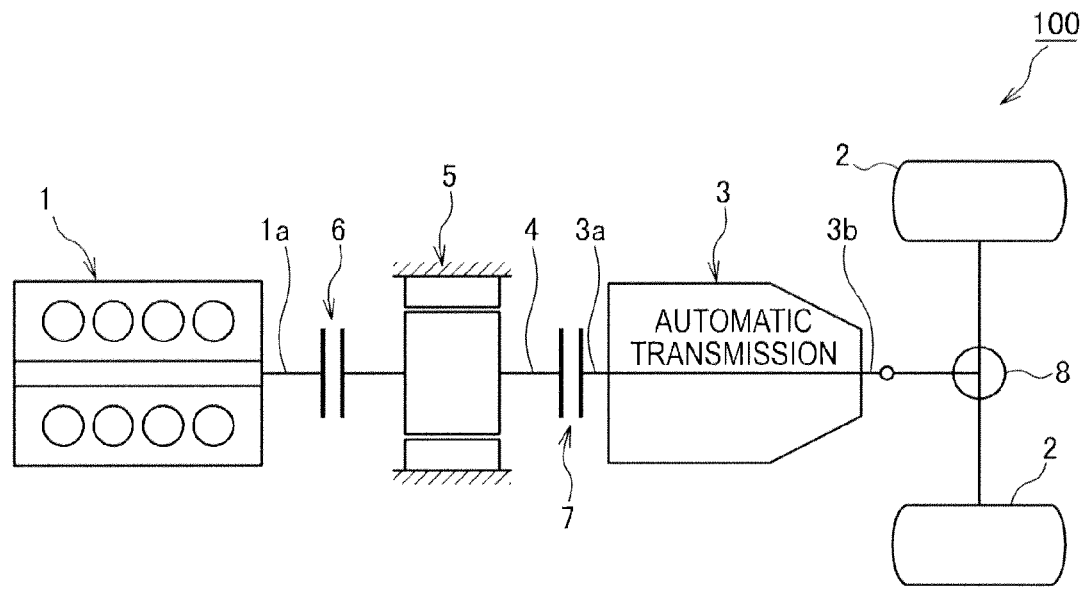
FIG. 5A is a diagram illustrating another exemplary power train of a hybrid vehicle having the regenerative braking control device according to the present invention.
Figure 5B:
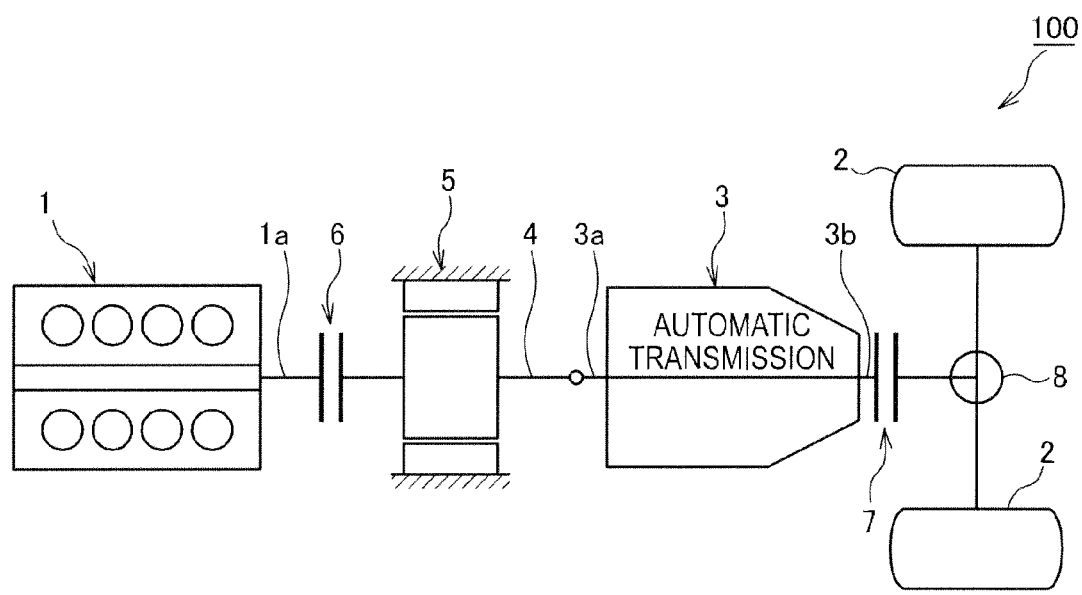
FIG. 5B is a diagram illustrating still another exemplary power train of a hybrid vehicle having the regenerative braking control device according to the present invention.

For example, in FIG. 1, the second clutch 7 that separably combines the motor/generator 5 and the drive wheel 2 is interposed between the motor/generator 5 and the automatic transmission 3 and is integrated into the automatic transmission 3. However, the invention is not limited to such a configuration. As illustrated in FIG. 5A, the second clutch 7 may be provided outside the automatic transmission 3 separately from the automatic transmission 3. Alternatively, as illustrated in FIG. 5B, the second clutch 7 may be interposed between the automatic transmission 3 and the differential gear unit 8. The same functionalities as those described above can be obtained even in such a configuration.

Although a so-called hybrid vehicle that drives the drive wheel using both the internal combustion engine and the motor/generator has been exemplarily described in the aforementioned embodiments, the invention may also be applied to an electric vehicle that drives the drive wheel only using the motor/generator.

Moreover, the aforementioned embodiments may be appropriately combined

The present application claims priority to Japanese Patent Application No. 2010-237539 filed in Japan Patent Office on Oct. 22, 2010. The contents of this application are incorporated herein by reference in their entirety.

The invention claimed is:

1. A regenerative braking control device for a vehicle, comprising:
   a driver request braking torque computation unit configured to compute a driver request braking torque based on brake pedaling of a driver; and
   a regenerative braking torque computation unit configured to compute a regenerative braking torque by restricting a response time of the regenerative braking torque to match a braking rate of a frictional brake based on a vehicle speed and the computed driver request braking torque, and compute the regenerative braking torque by releasing restriction on the response time of the regenerative braking torque in a case where the driver request braking torque decreases.

2. The regenerative braking control device for a vehicle according to claim 1, wherein:
   the regenerative braking torque computation unit releases the restriction on the response time of the regenerative braking torque in a case where system abnormality occurs.

3. The regenerative braking control device for a vehicle according to claim 2, wherein:
   the regenerative braking torque computation unit smoothly decreases the regenerative braking torque to zero when the system abnormality has a mode capable of applying the regenerative braking torque, and the regenerative braking torque computation unit immediately sets the regenerative braking torque to zero when the system abnormality has a mode incapable of applying the regenerative braking torque.

4. The regenerative braking control device for a vehicle according to claim 1, further comprising:
   a regenerative braking torque restriction unit configured to set a transmission transferable torque to the regenerative braking torque when the regenerative braking torque obtained by the regenerative braking torque computation unit exceeds the transmission transferable torque.

* * * * *